Oct. 12, 1926.
J. M. READEY
TAPPING MACHINE
Filed Sept. 1, 1922
1,602,504
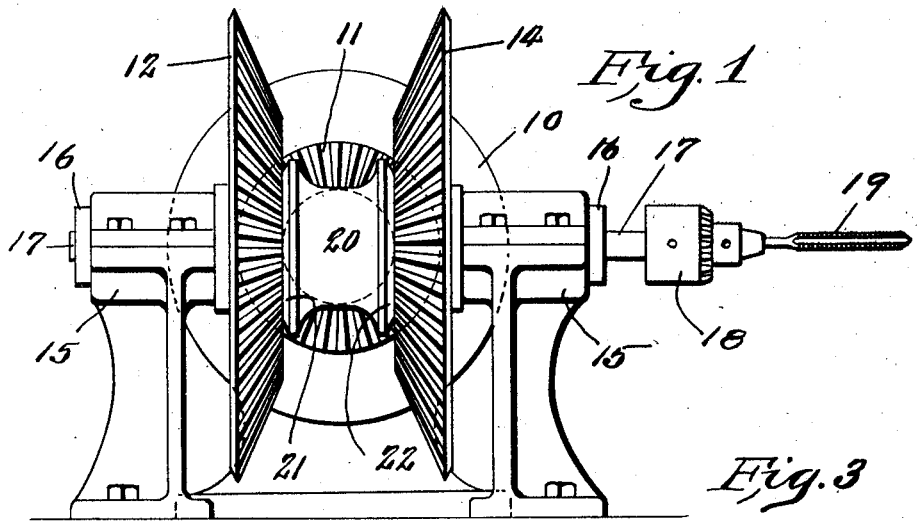
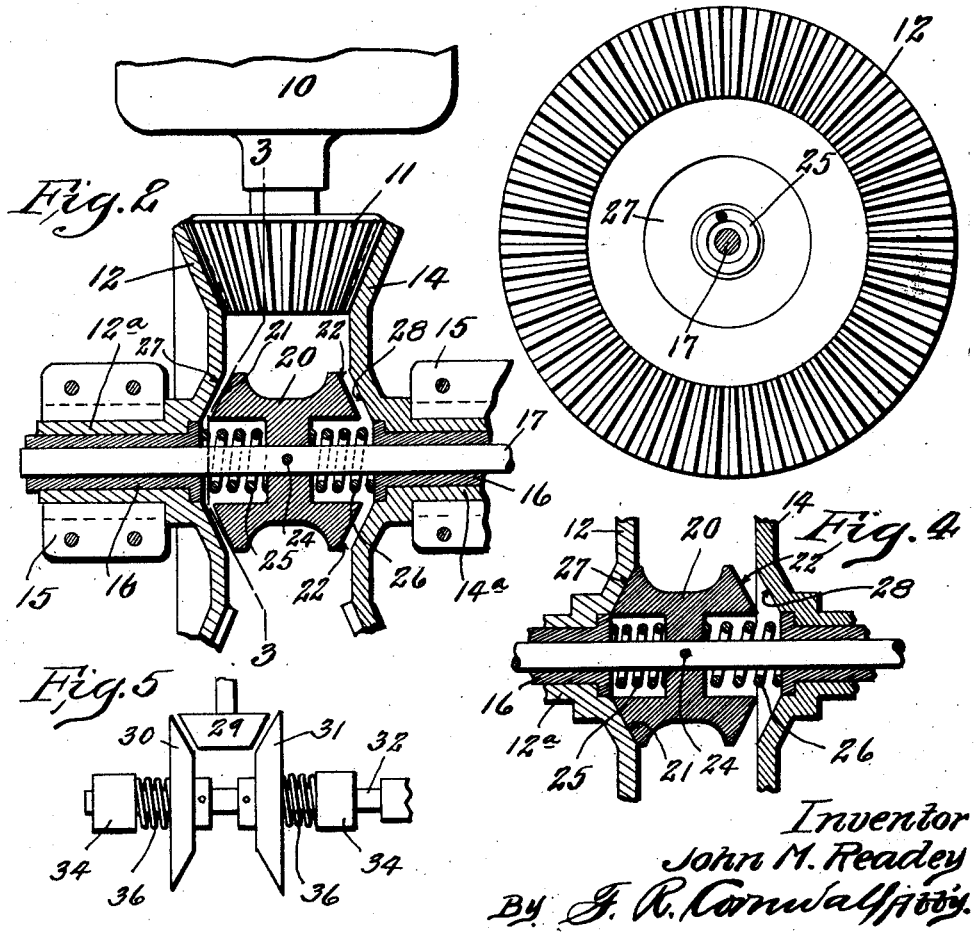
Inventor
John M. Readey
By J. R. Cornwall, Atty.

Patented Oct. 12, 1926.

1,602,504

UNITED STATES PATENT OFFICE.

JOHN M. READEY, OF ST. LOUIS, MISSOURI.

TAPPING MACHINE.

Application filed September 1, 1922. Serial No. 585,768.

This invention relates to new and useful improvements in tapping machines, and the objects of the invention are to provide a simple and inexpensive tapping machine which upon the completion of the tapping operation can be readily operated to reverse the direction of rotation of the tap so that the same can be quickly withdrawn from the work.

Further objects of my invention are to provide means for normally maintaining the tap stationary, which means when pressure is applied to the tap will permit it to be driven in one direction and upon the reversal of the direction of pressure cause said tap to be driven in the opposite direction.

With these and other objects in view, my invention consists in certain novel features of construction and arrangements of parts hereinafter more fully described and claimed, and illustrated in the accompanying drawings, in which—

Figure 1 is a front elevation of the tapping machine.

Figure 2 is a horizontal cross section through the same.

Figure 3 is a transverse cross section taken on line 3—3 of Figure 2 with the driving pinion removed.

Figure 4 is an enlarged horizontal cross section of the machine partly broken away and showing the tool carrying shaft in driving engagement with one of the driven members.

Figure 5 is a plan view of a modified form of the tapping machine.

Referring by numerals to the accompanying drawings, 10 designates a motor to the shaft of which is secured a beveled pinion 11. This pinion is in constant driving engagement with comparatively large beveled gears 12 and 14 arranged on the opposite sides of the pinion 11 and having formed integral therewith tubular extensions 12ª and 14ª which are loosely mounted in bearings 15. Sleeves 16 which are arranged in tubular extensions 12ª and 14ª form bearings for shaft 17. One end of this shaft projects forwardly from its respective bearing and has fixed thereon a chuck 18 which is adapted to receive a tap 19. A double faced friction clutch 20 having oppositely disposed beveled friction faces 21 and 22 is fixed to shaft 17, in any suitable manner, such as a pin 24, and occupies a position midway between beveled gears 12 and 14. This clutch is normally held in its central or disengaged position by coiled expansion springs 25 and 26 which are arranged on each side thereof.

The gears 12 and 14 have formed integral therewith or secured thereto beveled friction disks 27 and 28, respectively. These friction disks which are arranged on the inner faces of said gears are adapted to engage beveled friction faces 21 and 22 of clutch 20.

In the operation of the machine, assuming it is desired to thread an opening in a casting or other piece of work, the latter is placed against the tap 19 with the point thereof entering the opening. When pressure is applied to the work, and consequently to the tap 19, spring 25 is compressed and shaft 17 is shifted longitudinally in its bearings until friction face 21 of clutch 20 engages friction face 27. As the gear 12 on which friction disk 27 is arranged is driven in one direction by the driving gear 11, shaft 17 is rotated in the proper direction causing the tap 19 to enter and thread the opening in the work, by means of which pressure is applied thereto. When pressure is removed from the tap, as at the completion of the tapping operation, spring 25 will reassert itself and cause clutch 20 to move to its normal or inoperative position. If the pressure is now applied in the opposite direction, i. e., away from the machine as in trying to remove the work from the tap, shaft 17 and clutch 20 will be shifted longitudinally towards gear 14, compressing spring 26 and bringing the clutch face 22 into engagement with friction disk 28 of gear 14, the latter being operated in the opposite direction to that of disk 12. The direction of rotation of shaft 17 and tap 19 will be reversed and cause said tap to become quickly disengaged from the threaded opening in the work. Thus, the tapping operation can be quickly and efficiently accomplished at a great saving of time and labor.

The modified form illustrated in Figure 5 consists of a beveled driving member 29 which is adapted to be engaged by either one of a pair of oppositely disposed beveled driven members 30 and 31. These driven members are fixed to a shaft 32 which is slidably arranged in bearings 34 and is adapted to receive at one of its ends a suitable tool such as a tap.

Members 30 and 31 are normally held out of driving engagement with member 29, by means of spring 36 which are interposed between each member 30 and 31 and the bearings in which shaft 32 is journaled and tend to maintain said members 30 and 31 in inoperative positions. When pressure is applied to shaft 32, member 30 or 31, as the case may be, is brought into engagement with the driving member 29 and thereby actuates the tool carrying shaft 32.

When the direction of pressure applied to shaft 32 is reversed, as by pulling on the work at the completion of the tapping operation and while the tap is still in the threaded opening, the pull is transmitted, through the interengagement of the tap with the threads formed in the opening, to shaft 32, thus causing the latter to move in a corresponding direction, so that the driven member which was in engagement with the driving member 29 during the threading operation is displaced and the opposite driven member brought into engagement with the driving member, thereby reversing the direction of its rotation of shaft 32 and the tap carried thereby. Upon the removal of pressure from the shaft, spring 36 moves the driven member into inoperative position.

A tapping machine of my improved construction is simple in operation and inexpensive to manufacture and the springs form yielding means for normally maintaining the machine in operative position.

What I claim is:—

1. In a tapping machine, the combination of a driving member, a pair of spaced bearings, a pair of oppositely disposed driven members loosely journaled in said bearing and in operating engagement with said driving member, a shaft loosely journaled in the axial bores of said driven members and movable longitudinally relative thereto, a clutch member fixed to said shaft intermediate said driven members and provided with oppositely disposed clutch faces for engaging the respective clutch faces of said driven members, and a coiled spring interposed between each driven member and the respective end of said clutch member for normally maintaining the latter in disengaged position and yieldable to permit said clutch member to engage the respective driven member for actuating the shaft in a direction in definite relation with the direction of pressure applied to said shaft.

2. In a tapping machine, the combination of a driving member, a pair of spaced bearings, a pair of oppositely disposed driven members in driving engagement with said driving member and provided with integral tubular hubs loosely journaled in said bearings, a shaft loosely journaled in said tubular hubs and movable longitudinally relative thereto, a clutch member fixed to said shaft intermediate said driven members and provided with oppositely disposed clutch faces adapted to engage the respective clutch faces of said driven members, and a coiled spring interposed between each driven member and the respective end of said clutch members, the ends of said clutch member being provided with recesses for receiving said springs, said springs being balanced to normally maintain the clutch member out of driving engagement with said driven members and when pressure is applied to said shaft said clutch member is moved into engagement with one of said driven members and rotates said shaft in a predetermined direction in accordance with the direction of pressure applied to said shaft.

In testimony whereof I hereunto affix my signature this 26th day of August, 1922.

JOHN M. READEY.